United States Patent
Choi

(10) Patent No.: US 11,053,992 B2
(45) Date of Patent: Jul. 6, 2021

(54) DRUM BRAKE APPARATUS

(71) Applicant: HYUNDAI MOBIS CO., LTD., Seoul (KR)

(72) Inventor: Moo Jin Choi, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 84 days.

(21) Appl. No.: 16/281,571

(22) Filed: Feb. 21, 2019

(65) Prior Publication Data

US 2020/0056667 A1 Feb. 20, 2020

(30) Foreign Application Priority Data

Aug. 17, 2018 (KR) .................. 10-2018-0096269

(51) Int. Cl.
| | | |
|---|---|---|
| *F16D 51/24* | (2006.01) | |
| *F16D 51/22* | (2006.01) | |
| *B60T 1/06* | (2006.01) | |
| *F16D 65/22* | (2006.01) | |
| *F16D 51/00* | (2006.01) | |
| *F16D 121/24* | (2012.01) | |
| *F16D 125/06* | (2012.01) | |
| *F16D 125/40* | (2012.01) | |
| *F16D 125/52* | (2012.01) | |
| *F16D 121/04* | (2012.01) | |

(52) U.S. Cl.
CPC .............. *F16D 51/24* (2013.01); *B60T 1/067* (2013.01); *F16D 51/22* (2013.01); *F16D 65/22* (2013.01); *F16D 2051/003* (2013.01); *F16D 2051/005* (2013.01); *F16D 2121/04* (2013.01); *F16D 2121/24* (2013.01); *F16D 2125/06* (2013.01); *F16D 2125/40* (2013.01); *F16D 2125/52* (2013.01)

(58) Field of Classification Search
CPC .......... F16D 51/20; F16D 51/22; F16D 51/24; F16D 65/22; F16D 2051/003; F16D 2051/005; F16D 2121/04; F16D 2121/24; F16D 2125/06; F16D 2125/40; F16D 2125/52
USPC ....................................................... 188/327
See application file for complete search history.

(56) References Cited

U.S. PATENT DOCUMENTS

| | | | | |
|---|---|---|---|---|
| 5,024,299 A | * | 6/1991 | Shaw ...................... | B60T 13/74 188/156 |
| 5,823,636 A | * | 10/1998 | Parker ...................... | B60T 7/22 303/3 |

(Continued)

FOREIGN PATENT DOCUMENTS

| | | |
|---|---|---|
| CN | 106164525 A | 11/2016 |
| KR | 10-2001-0085561 A | 9/2001 |
| KR | 10-2018-0047519 A | 5/2018 |

OTHER PUBLICATIONS

Office Action of corresponding Chinese Patent Application No. 201910115842.4—6 pages (dated Jul. 30, 2020).

*Primary Examiner* — Thomas W Irvin
(74) *Attorney, Agent, or Firm* — NovoTechIP International PLLC

(57) ABSTRACT

A drum brake apparatus may include: a housing; a main braking part installed at one side of the housing, and driven by hydraulic pressure to pressurize shoes during main braking; and a parking braking part installed at the other side of the housing, and driven by an electromotive force to pressurize the shoes during parking braking.

16 Claims, 8 Drawing Sheets

(56) References Cited

U.S. PATENT DOCUMENTS

| | | | | |
|---|---|---|---|---|
| 6,003,645 | A * | 12/1999 | Asai | F16D 51/24 |
| | | | | 188/328 |
| 6,082,505 | A * | 7/2000 | Asai | F16D 51/24 |
| | | | | 188/79.54 |
| 6,328,141 | B1 * | 12/2001 | Asai | F16D 51/20 |
| | | | | 188/196 BA |
| 6,405,838 | B1 * | 6/2002 | Shaw | B60T 13/741 |
| | | | | 188/106 P |
| 6,877,590 | B2 * | 4/2005 | Ikeda | F16D 51/20 |
| | | | | 188/79.54 |
| 7,472,776 | B2 * | 1/2009 | Charmat | F16D 51/20 |
| | | | | 188/196 BA |
| 9,566,956 | B2 * | 2/2017 | Koga | F16D 65/09 |
| 2001/0018999 | A1 * | 9/2001 | Hasegawa | F16D 65/22 |
| | | | | 188/78 |
| 2012/0205209 | A1 * | 8/2012 | Tsuzuku | F16D 65/563 |
| | | | | 188/325 |
| 2013/0068576 | A1 * | 3/2013 | Ko | F16D 51/22 |
| | | | | 188/327 |
| 2019/0344761 | A1 * | 11/2019 | Cho | F16D 51/22 |
| 2020/0001848 | A1 * | 1/2020 | Gaggero | B60T 17/043 |
| 2020/0055505 | A1 * | 2/2020 | Choi | B60T 13/588 |

* cited by examiner

SECTION A-A'

SECTION B-B'

DRUM BRAKE APPARATUS

CROSS-REFERENCES TO RELATED APPLICATIONS

The present application claims priority to Korean application number 10-2018-0096269, filed on Aug. 17, 2018, which is incorporated by reference in its entirety.

BACKGROUND OF THE INVENTION

The present invention relates to a drum brake apparatus, and more particularly, to a drum brake apparatus which generates a braking force through friction with a drum rotating with a wheel.

In general, a drum brake refers to an apparatus that generates a braking force through friction with a drum rotating with a wheel. Specifically, the drum brake acquires a braking force through hydraulic pressure (main braking) or acquires a braking force by rubbing a shoe having a friction material attached thereon against a drum using a cable connected to a parking brake lever (parking braking).

The conventional drum brake includes a drum, a pair of shoes disposed on a back plate so as to face the inner circumferential surface of the drum and having a friction material on the outer circumference thereof, and a wheel cylinder for main braking, which receives braking hydraulic pressure to move the shoes toward the outside. Furthermore, an operation lever for parking braking, installed on the drum brake, has one end axially coupled to the shoes and the other end connected to a parking brake lever installed beside the driver's seat through a cable. Then, when a driver pulls the parking brake lever, parking braking is mechanically performed.

The related art of the present invention is disclosed in Korean Patent Publication No. 2018-0047519 published on May 10, 2018 and entitled "Drum Brake for Vehicle".

In the related art, a main braking apparatus for main braking and a parking braking apparatus for parking braking are separately manufactured and installed. When the main braking apparatus and the parking braking apparatus are separately manufactured and managed, many inconveniences may arise. For example, assembly positions need to be set and adjusted in order to secure a distance between the main braking apparatus and the parking braking apparatus in consideration of interference therebetween according to the specification, and the main braking apparatus and the parking braking apparatus need to be designed and assembled. In this case, the productivity may be reduced, and the unit cost may be increased.

Therefore, there is a demand for a structure capable of solving the problem.

SUMMARY OF THE INVENTION

Embodiments of the present invention are directed to a drum brake capable of performing main braking and parking braking.

In one embodiment, a drum brake apparatus may include: a housing; a main braking part installed at one side of the housing, and driven by hydraulic pressure to pressurize shoes during main braking; and a parking braking part installed at the other side of the housing, and driven by an electromotive force to pressurize the shoes during parking braking.

The housing may include: a housing part; a hollow piston housing part formed at one side of the housing part, and having the main braking part installed therein; and a hollow rod housing part formed at the other side of the housing part, and having the parking braking part installed therein.

The rod housing part may be disposed at a preset distance from the piston housing part.

The housing part may include: a main body part in which the piston housing part and the rod housing part are formed; a fixing part formed on the main body part, and fixed to a back plate; and a foreign matter prevention part coupled to one side of the main body part, where openings of the piston housing part and the rod housing part are positioned, and covering the edge of the piston housing part and the edge of the rod housing part.

The fixing part may include: a fixed fastening part formed at both sides of the main body part, and fixed to the back plate with an actuator by a fastening member; and a movement prevention part protruded from a position of the main body part, corresponding to the main braking part, and fitted into a through-hole formed in the back plate.

The foreign matter prevention part may include: a connection part disposed between the opening of the piston housing part and the opening of the rod housing part; a piston sealing part having a ring shape corresponding to the edge of the piston housing part, formed continuously with one side of the connection part, and having an inner end connected to the main braking part; a rod sealing part having a ring shape corresponding to the edge of the rod housing part, formed continuously with the other side of the connection part, and having an inner end connected to the parking braking part; and a main body fixing part formed on the connection part, and fixed to the main body part.

The foreign matter prevention part may be formed of a ductile or flexible material.

The piston housing part may include: a hollow cylinder formed in a circumferential shape on the housing part, and having the main braking part housed therein; and a hydraulic pressure flow path extended from the outer surface of the housing part to the cylinder, and forming a flow path to supply fluid into the cylinder.

The hydraulic pressure flow path may have an open outer end formed at the movement prevention part installed on the rear surface of the main body part, and an inner end facing an elastic member of the main braking part installed in the cylinder.

The rod housing part may include: a hollow rod cylinder formed in a circumferential shape on the housing part, and having the parking braking part housed therein; and a driving shaft housing part disposed at a preset distance from the piston housing part and communicating with the rod cylinder, wherein an output shaft of the actuator is introduced into the driving shaft housing part and connected to the parking braking part.

A fastening member for fastening the housing part to the back plate may be disposed at a position spaced apart by a preset distance from the central axis of the driving shaft housing part toward the piston housing part.

The main braking part may include: a pair of pistons disposed at ends of the housing, and pressurizing the shoes while moved to the outside of the housing by hydraulic pressure; and an elastic member disposed in the housing, and reducing a shock force applied to the pistons returned to the inside of the housing.

The elastic member may be disposed between the pair of pistons.

The parking braking part may include: a gear part disposed in the housing, and rotated in connection with an actuator; and a rod part connected to the gear part, and pressurizing the shoes while moved to the outside of the housing in connection with the gear part.

DESCRIPTION OF SPECIFIC EMBODIMENTS

Hereafter, a drum brake apparatus in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
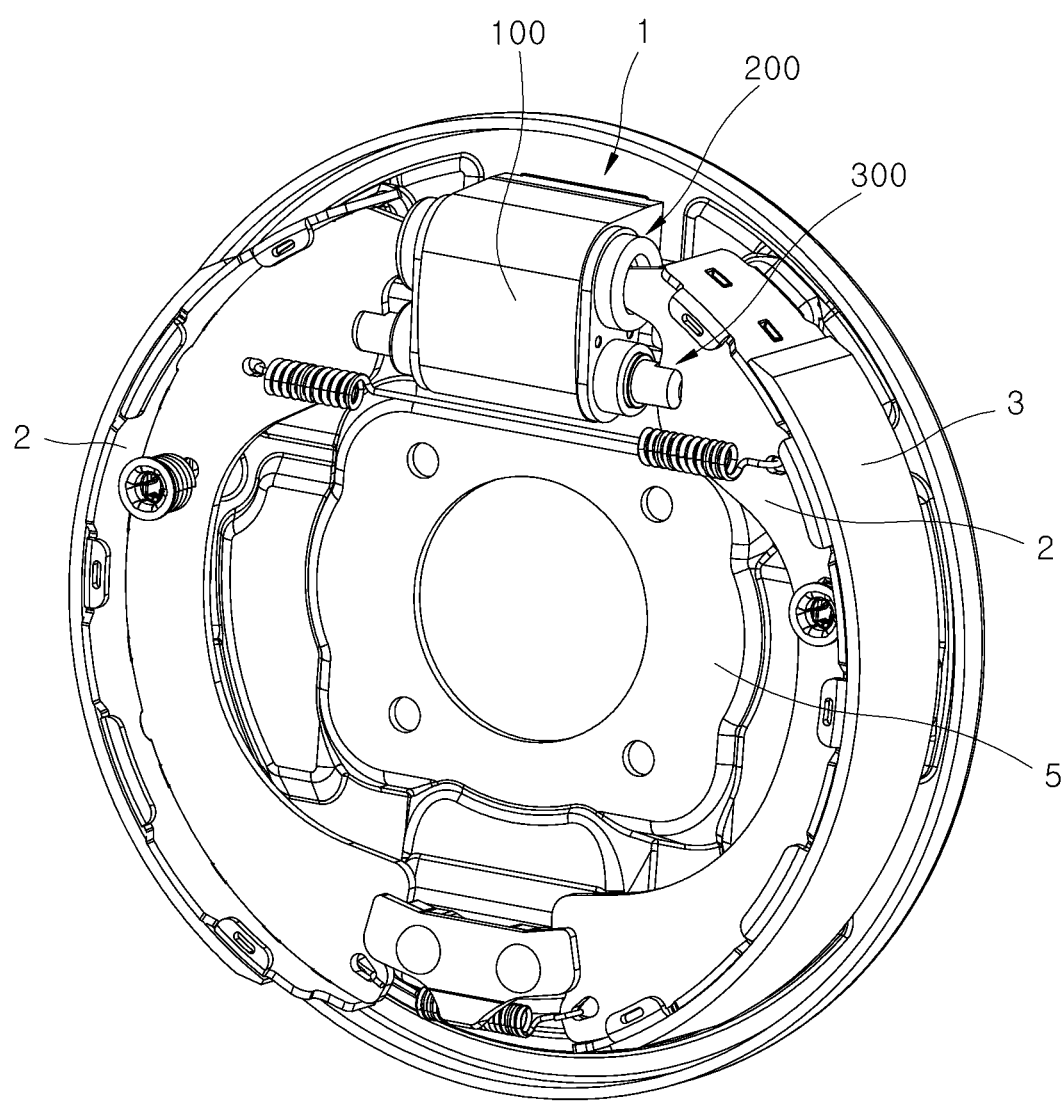
FIG. 1 is a front perspective view illustrating an installation state of a drum brake apparatus in accordance with an embodiment of the present invention.
Figure 2:
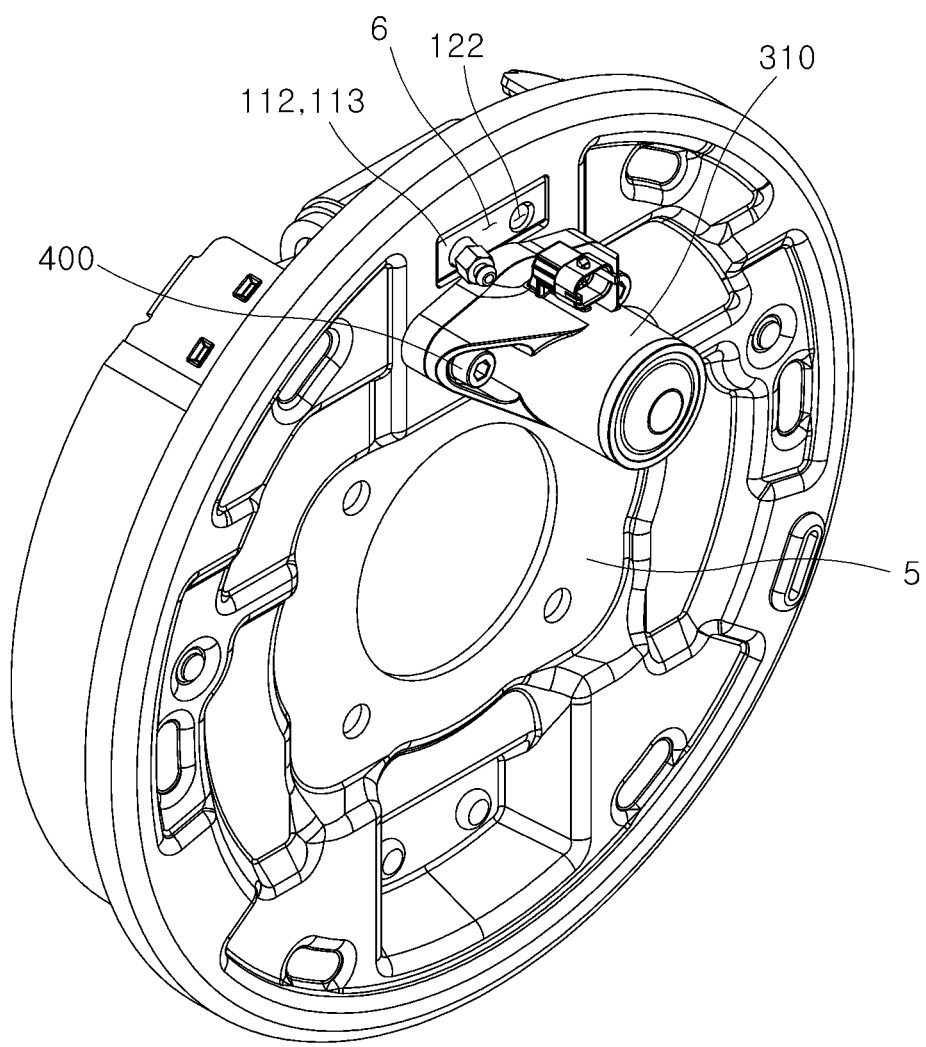
FIG. 2 is a rear perspective view illustrating the installation state of the drum brake apparatus in accordance with the embodiment of the present invention.
Figure 3:
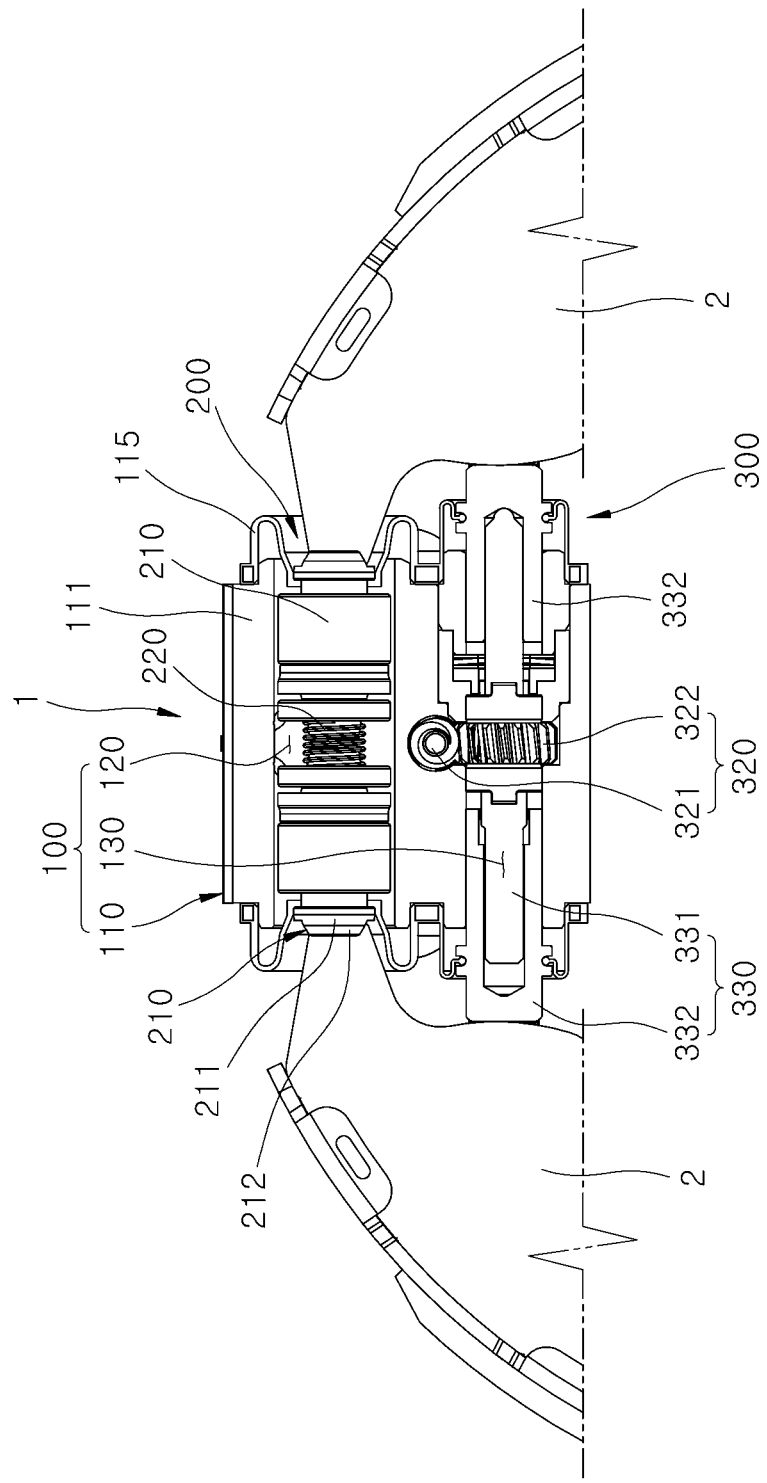
FIG. 3 is a cross-sectional view illustrating main parts of the drum brake apparatus in accordance with the embodiment of the present invention.

FIG. 1 is a front perspective view illustrating an installation state of a drum brake apparatus in accordance with an embodiment of the present invention, FIG. 2 is a rear perspective view illustrating the installation state of the drum brake apparatus in accordance with the embodiment of the present invention, and FIG. 3 is a cross-sectional view illustrating main parts of the drum brake apparatus in accordance with the embodiment of the present invention.

Referring to FIGS. 1 and 3, the drum brake apparatus 1 in accordance with the embodiment of the present invention may include a housing 100, a main braking part 200 and a parking braking part 300.

The housing 100 may be disposed between a pair of shoes 2 at the left and right sides thereof. The main braking part 200 may be installed at one side of the housing 100. During main braking, the main braking part 200 may be driven by hydraulic pressure and pressurize the shoes 2. The parking braking part 300 may be installed at the other side of the housing 100. During parking braking, the parking braking part 300 may be driven by an electromotive force and pressurize the shoes 2. Both ends of the main braking part 200 may be engaged with one sides of the shoes 2, and the parking braking part 300 may be engaged with the other sides of the shoes 2, with a preset distance provided between the main braking part 200 and the parking braking part 300.

Referring to FIG. 3, the housing 100 in accordance with the embodiment of the present invention may include a housing part 110, a piston housing part 120 and a rod housing part 130.

The housing part 110 may constitute the basic frame of the housing 100, and have a block shape. The piston housing part 120, in which the main braking part 200 is installed, may be hollowly formed at one side of the housing part 110. The rod housing part 130, in which the parking braking part 300 is installed, may be hollowly formed at the other side of the housing part 110, with a preset distance provided between the piston housing part 120 and the rod housing part 130.

Figure 4:
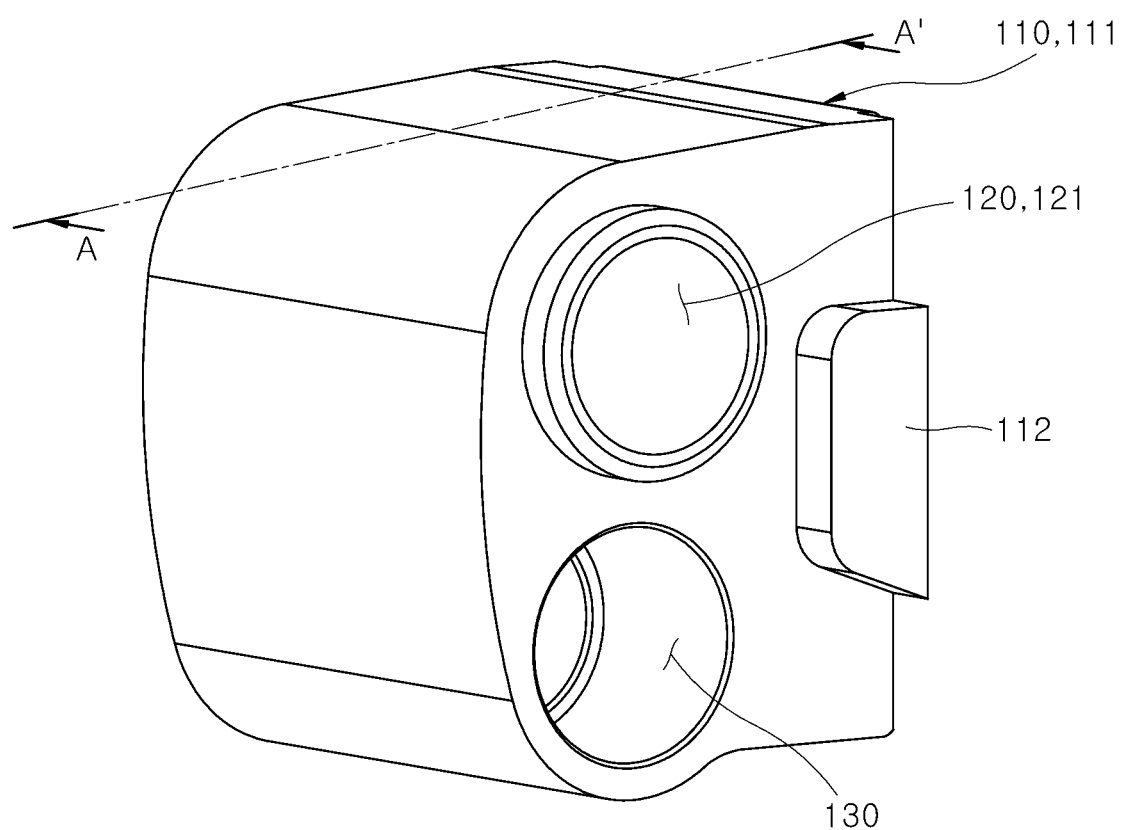
FIG. 4 is a front perspective view illustrating a main body part of the drum brake apparatus in accordance with the embodiment of the present invention.
Figure 5:
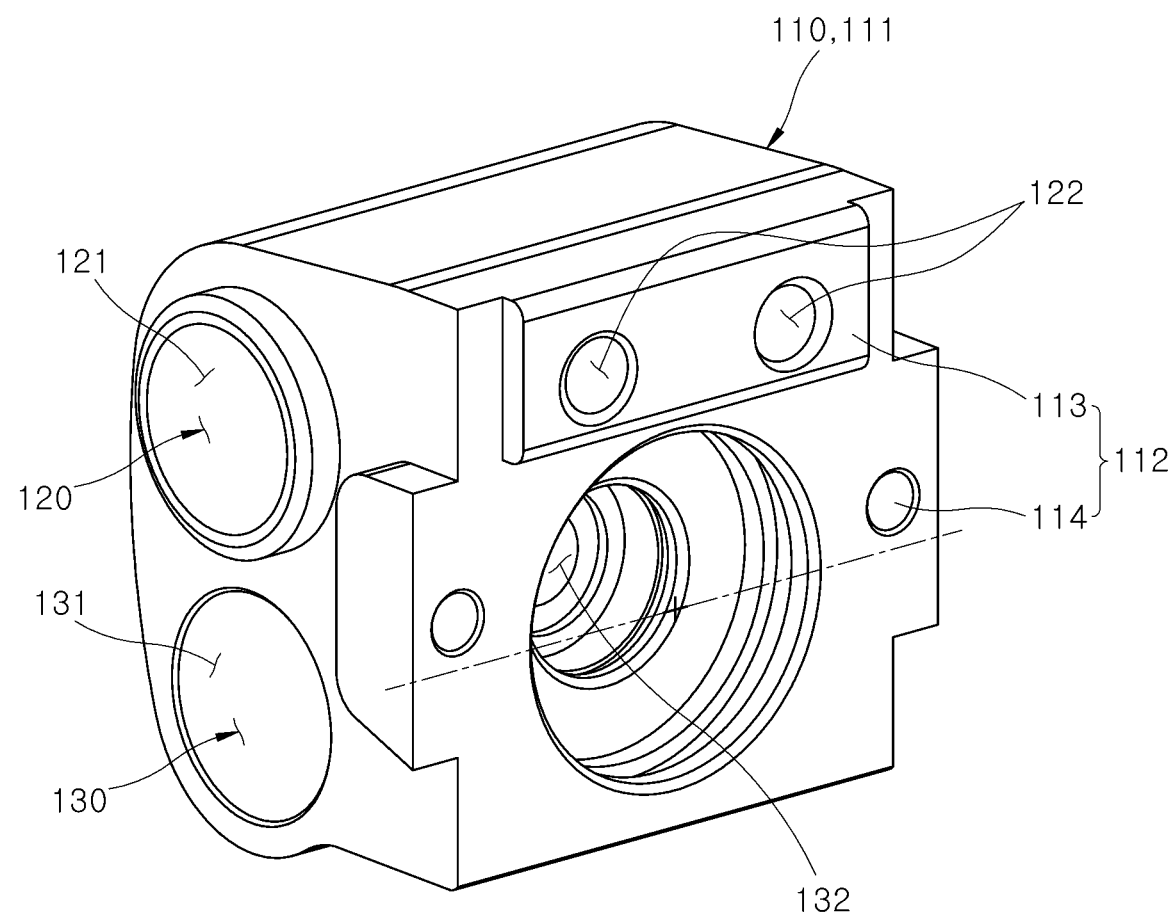
FIG. 5 is a rear perspective view illustrating the main body part of the drum brake apparatus in accordance with the embodiment of the present invention.
Figure 6:
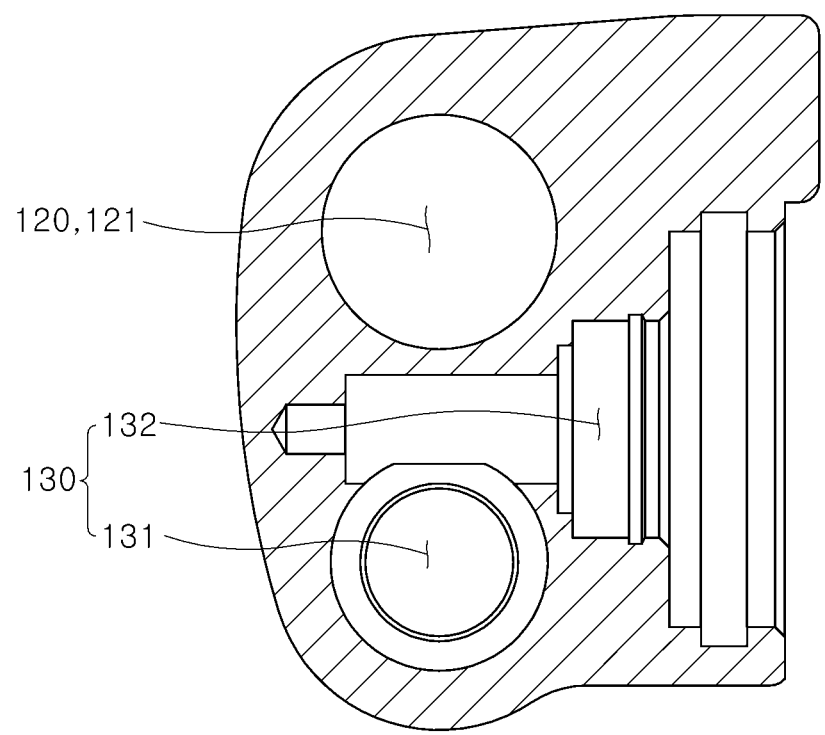
FIG. 6 is a cross-sectional view taken along the line A-A' of FIG. 4.

FIG. 4 is a front perspective view illustrating a main body part of the drum brake apparatus in accordance with the embodiment of the present invention, FIG. 5 is a rear perspective view illustrating the main body part of the drum brake apparatus in accordance with the embodiment of the present invention, and FIG. 6 is a cross-sectional view taken along the line A-A' of FIG. 4.

Referring to FIGS. 3 to 5, the housing part 110 in accordance with the embodiment of the present invention may include a main body part 111, a fixing part 112 and a foreign matter prevention part 115.

The main body part 111 may be disposed facing an actuator 310, with a back plate 5 interposed therebetween. The piston housing part 120 and the rod housing part 130 may be formed on the main body part 111 so as to extend in the lateral direction, and have both open ends. The fixing part 112 may be fixed to the back plate 5, and formed on the rear surface of the main body part 111, which abuts on the back plate 5. The fixing part 112 in accordance with the embodiment of the present invention may include a fixed fastening part 114 and a movement prevention part 113.

The fixed fastening part 114 may be fixed to the back plate 5 by a fastening member 400, and formed at either side of the main body part 111. The fixed fastening part 114 may have a female screw to which the fastening member 400 such as a bolt can be screwed. Referring to FIG. 2, the fastening member 400 may be sequentially passed through a fastening part formed at either side of the actuator 310 and the back plate 5, and fastened to the fixed fastening part 114, thereby fixing the main body part 111 and the actuator 310 to the back plate 5. As the fastening member 400 is fastened, the main body part 111 and the actuator 310 may be connected to each other and installed close to the front and rear surfaces of the back plate 5, respectively.

The movement prevention part 113 may be formed at a position of the main body part 111, corresponding to the main braking part 200. The back plate 5 may have a through-hole 6 for engagement with the movement prevention part 113. The through-hole 6 may have a horizontally extended rectangular shape, and the movement prevention part 113 may have a rectangular shape corresponding to the through-hole 6. The movement prevention part 113 having a shape corresponding to the through-hole 6 may be fitted into the through-hole 6 and thus stably constrained from moving in the top-to-bottom direction or side-to-side direction, while fixed to the back plate 5.

The main body part 111 may be stably constrained from moving in a forward/backward direction, i.e. an output-shaft direction of the actuator 310, by the fastening member 400 fastened to the fixed fastening part 114 through the back plate 5 from the rear of the actuator 310. Furthermore, the main body part 111 may be stably constrained from moving in the radial direction of the actuator 310 by the movement prevention part 133 fitted into the through-hole 6 formed in the back plate 5.

Figure 7:
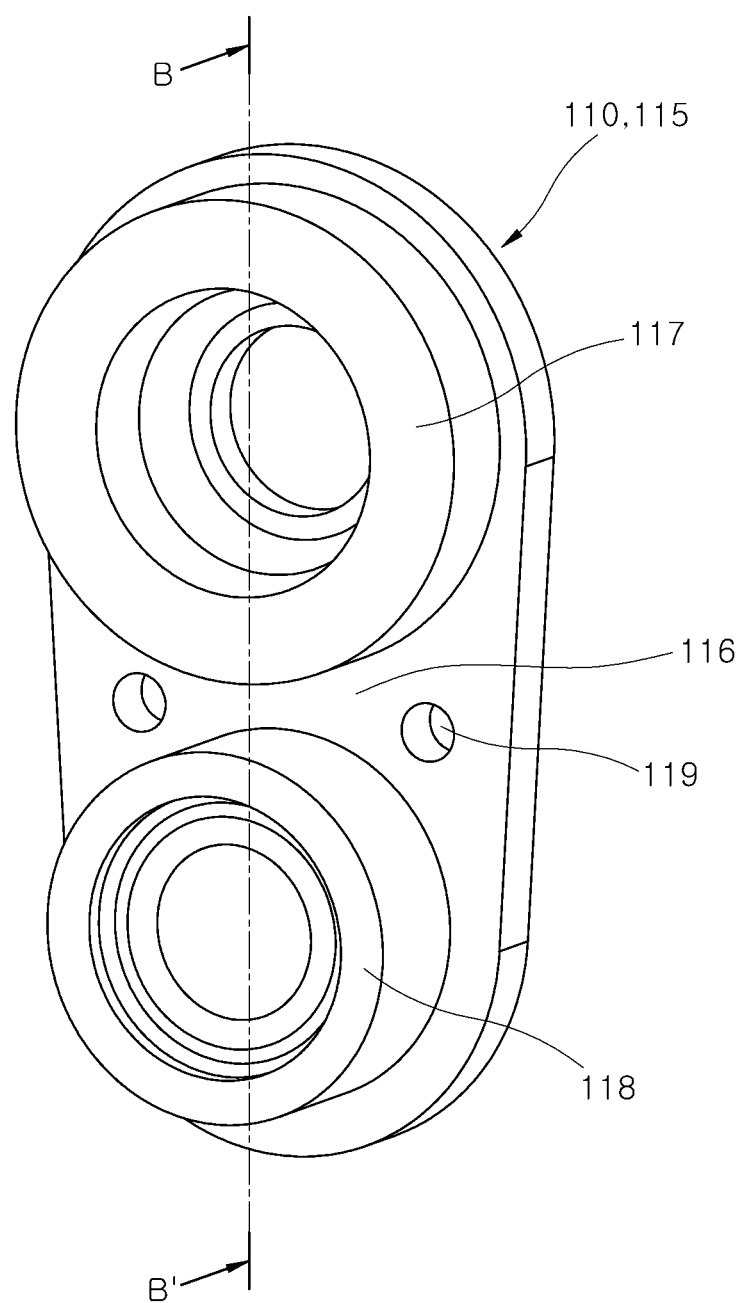
FIG. 7 is a cross-sectional view illustrating a foreign matter prevention part of the drum brake apparatus in accordance with the embodiment of the present invention.
Figure 8:
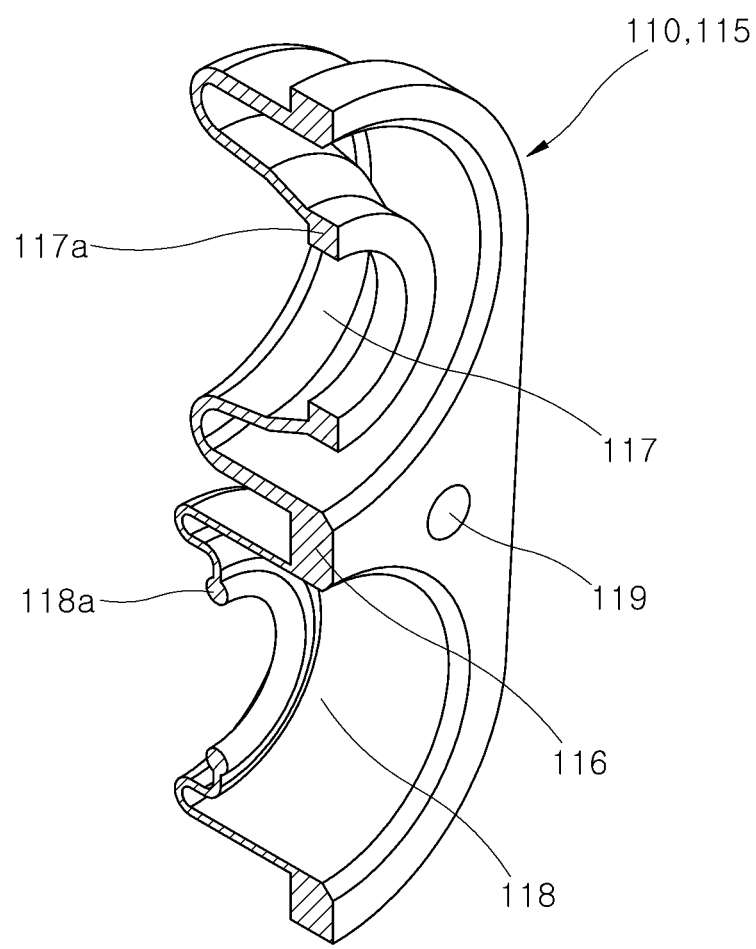
FIG. 8 is a cross-sectional view taken along the line B-B' of FIG. 7.

FIG. 7 is a perspective view illustrating the foreign matter prevention part of the drum brake apparatus in accordance with the embodiment of the present invention, and FIG. 8 is a cross-sectional view taken along the B-B' line of FIG. 7.

The foreign matter prevention part 115 may serve to prevent foreign matters from flowing into the piston housing part 120 and the rod housing part 130, and may be coupled to both sides of the main body part 111 in which openings of the piston housing part 120 and the rod housing part 130 are positioned. The foreign matter prevention part 115 may be formed of a ductile or flexible material, and installed to cover the edges of the piston housing part 120 and the rod housing part 130.

Thus, the foreign matter prevention part 115 may serve to constrain the main braking part 200 from moving to the outside of the piston housing part 120, and simultaneously constrain the parking braking part 300 from moving to the outside of the rod housing part 130, without disturbing the operations of the main braking part 200 and the parking braking part 300. Referring to FIGS. 7 and 8, the foreign matter prevention part 115 in accordance with the embodiment of the present invention may include a connection part 116, a piston sealing part 117, a rod sealing part 118 and a main body fixing part 119.

The connection part 116 may be disposed between the openings of the piston housing part 120 and the rod housing part 130 which are formed at the side surface of the main body part 111. The piston sealing part 117 having a shape corresponding to the edge of the piston housing part 120 may be formed continuously with the connection part 116. The rod sealing part 118 having a shape corresponding to the edge of the rod housing part 130 may be formed continuously with the other side of the connection part 116.

When the piston housing part 120 is disposed over the rod housing part 130, the connection part 116 may be disposed between the piston housing part 120 and the rod housing part 130, the piston sealing part 117 may be formed at the top of the connection part 116 and integrated with the connection part 116, and the rod sealing part 118 may be formed at the bottom of the connection part 116 and integrated with the connection part 116.

The opening of the piston housing part 120 may have a circular shape, and the piston sealing part 117 may have a ring shape corresponding to the edge of the piston housing part 120. The edge of the piston housing part 120 may be protruded to a preset thickness from the main body part 111. Referring to FIG. 3, the outer circumference of the piston sealing part 117 may be fixed to the housing part 110 while covering the edge of the piston housing part 120. The inner circumference 117a of the piston sealing part 117 may be fitted into the main braking part 200 or specifically a coupling groove 211 formed in a piston 210 of the main braking part 200 through the opening of the piston housing part 120, and connected to the piston 210.

The opening of the rod housing part 130 may have a circular shape, and the rod sealing part 118 may have a ring shape corresponding to the edge of the rod housing part 130. The edge of the rod housing part 130 may be protruded to a preset thickness from the main body part 111. Referring to FIG. 3, the outer circumference of the rod sealing part 118 may be fixed to the housing part 110 while covering the edge of the rod housing part 130. The inner circumference 118a of the rod sealing part 118 may be fitted into the parking braking part 300 or specifically a groove formed at the circumference of a push rod 332 of the parking braking part 300 through the opening of the rod housing part 130, and connected to the push rod 332.

Fluid for creating a hydraulic pressure atmosphere may be introduced into the piston housing part 120, and lubricant for smooth operations of a gear part 320 and a rod part 330 may be introduced into the rod housing part 130. The piston sealing part 117 and the rod sealing part 118 can not only prevent the fluid within the piston housing part 120 and the rod housing part 130 from flowing to the outside through the openings, but also preventing foreign matters from permeating into the main braking part 200 and the parking braking part 300.

The main body fixing part 119 may serve to reliably fix and connect the foreign matter prevention part 115 to the main body part 111, and may be formed in the connection part 116. The main body fixing part 119 may have a hole structure through which a fastening part such as a bolt can be passed. The connection part 116 may be disposed between the piston sealing part 117 and the rod sealing part 118, and the main body fixing part 119 may be formed in the connection part 116. Therefore, as the main body part 111 is fixed to the main body fixing part 119 through the fastening part, the piston sealing part 117 and the rod sealing part 118 may be reliably fastened to the main body part 111.

Referring to FIGS. 4 to 6, the piston housing part 120 in accordance with the embodiment of the present invention may include a cylinder 121 and a hydraulic pressure flow path 122.

The cylinder 121, in which the main braking part 200 is housed, may be hollowly formed in the housing part 110. The cylinder 121 may cross the housing part 110 in the side-to-side direction, and have both open ends formed at side surfaces of the housing part 110. The hydraulic pressure flow path 122 may constitute a path for supplying fluid for creating a hydraulic pressure atmosphere in the cylinder 121, and extend from the outer surface of the housing part 110 to the cylinder 121.

The hydraulic pressure flow path 122 may have an open outer end formed at the movement prevention part 113 installed on the rear surface of the main body part 111. Since the movement prevention part 113 is exposed to the rear of the back plate 5 through the through-hole 6, fluid can be stably supplied into the cylinder 121 through the hydraulic pressure flow path 122 from the rear of the back plate 5, without interference with a plurality of parts including the pair of shoes 2 installed at the front of the back plate 5.

The hydraulic pressure flow path 122 communicating with the cylinder 121 may have an inner end facing an elastic member 220 of the main braking part 200 installed in the cylinder 121. The pair of left and right hydraulic pressure flow paths 122 may have a space formed therebetween, the space gradually becoming narrow in a V-shape from the outer ends toward the inner ends. Therefore, the fluid introduced into the hydraulic pressure flow path 122 may flow toward the elastic member 220 disposed in the middle of the cylinder 121.

Through such a structure of the hydraulic pressure flow path 122, the fluid introduced into the cylinder 121 can uniformly disperse and spread into the cylinder 121 while interfering with the elastic member 220, which makes it possible to prevent shock from being repeatedly applied only to the inner wall of the cylinder 121 or one side of the piston 210 while the fluid is introduced into the cylinder 121.

Referring to FIGS. 4 to 6, the rod housing part 130 in accordance with the embodiment of the present invention may include a rod cylinder 131 and a driving shaft housing part 132.

The rod cylinder 131, in which the rod part 330 of the parking braking part 300 and a driven gear 322 of the gear part 320 are housed, may be hollowly formed in a circumferential shape in the housing part 110. The rod cylinder 131 may be disposed in parallel to the cylinder 121 while crossing the housing part 110 in the side-to-side direction, and have both open ends formed at the side surface of the housing part 110.

The driving shaft housing part 132, in which a driving gear 321 of the gear part 320 of the parking braking part 300 and the output shaft of the actuator 310 are housed, may communicate with the rod cylinder 131. The output shaft of the actuator 310 may be introduced into the housing part 110 through the driving shaft housing part 132, and connected to the gear part 320 of the parking braking part 300.

The driving shaft housing part 132 may be disposed at a preset distance from the piston housing part 120. Hereafter, the preset distance will be referred to as 'first distance'. The distance between the driving shaft housing part 132 and the piston housing part 120 may be freely varied in such a range that the driving shaft housing part 132 and the piston housing part 120 neither interferes with each other nor communicate with each other. As the distance between the driving shaft housing part 132 and the piston housing part 120 is shortened, the volume and weight of the housing part 110 can be reduced. Such a structure can reduce the size of the drum brake apparatus, while the size of the conventional drum brake apparatus in which the main braking apparatus and the parking braking apparatus are separately installed is inevitably increased by reflecting the casing thickness of the main braking apparatus, the casing thickness of the parking braking apparatus and the distance between the main braking apparatus and the parking braking apparatus.

Referring to FIG. 5, the fastening member 400 for fixing the housing part 110 to the back plate 5 may be disposed at a position spaced apart by a preset distance from the central axis of the driving shaft housing part 132 toward the piston housing part 120. Hereafter, the preset distance will be referred to as 'second distance'. The second distance may be proportional to the distance between the driving shaft housing part 132 and the piston housing part 120, i.e. the first distance. Therefore, the fastening member 400 may be positioned between the center axis of the driving shaft housing part 132 and the central axis of the piston housing part 120.

The fixed fastening part 114 and the fastening member 400 may be coupled to the back plate 5, and support the entire weight of the housing 100, the main braking part 200 and the parking braking part 300. As described above, the fastening member 400 may not be disposed on the same horizontal line as the central axis of the driving shaft housing part 132, but disposed at the position spaced apart by the second distance from the driving shaft housing part 132 toward the piston housing part 120. Thus, the fixing force by the fastening member 400 may not be concentrated on the parking braking part 300, but uniformly applied to the main braking part 200 and the parking braking part 300. Therefore, structural stability can be further improved in the coupling relation between the back plate 5 and the drum brake apparatus 1 in accordance with the embodiment of the present invention.

As the number of the fastening members 400 and the number of installation places of the fastening members 400 are increased, the housing part 110 can be reliably fixed to the back plate 5. In this case, however, since the number of parts applied to the structure of the assembly part for fastening the fastening members 400 is increased, the production and assembling processes may become complicated and thus increase the cost. As the fastening members 400 are disposed at positions spaced apart by the second distance from the driving shaft housing part 132 toward the piston housing part 120, the drum brake apparatus 1 in accordance with the embodiment of the present invention can be stably installed on the back plate 5 through a smaller number of fastening members 400, which makes it possible to not only simplify the process, but also reduce the weight and cost.

Referring to FIGS. 1 to 3, the main braking part 200 in accordance with the embodiment of the present invention may include a piston 210 and an elastic member 220.

The piston 210 may pressurize the shoes 2 toward the drum (not illustrated) or release the shoes 2 from the drum, while moved to the inside/output of the cylinder 121 along the cylinder 121 by hydraulic pressure. In the present embodiment, the pair of left and right pistons 210 may be disposed at both ends of the cylinder 121. The piston 210 may include a coupling groove 211 and a shoe coupling part 212, which are formed at an end thereof, exposed to the outside of the cylinder 121.

The coupling groove 211 may be formed in a circular shape along the outer circumference of the piston 210, and the inner circumference 117a of the piston sealing part 117 may be fitted and coupled to the coupling groove 211. As the inner circumference 117a of the piston sealing part 117 is fitted and fixed to the coupling groove 211, the cylinder 121 may be sealed. The shoe coupling part 212 may be formed in a slit shape into which an end of the shoe 2 can be inserted, and engaged with the shoe 2.

When fluid is introduced through the hydraulic pressure flow path 122, the internal pressure of the cylinder 121 may be increased to move the pair of pistons 210. In this case, the distance between the pair of pistons 210 may be extended to push the pair of left and right pistons 210. Through such a process, main braking may be performed. When fluid is discharged through the hydraulic pressure flow path 122, the internal pressure of the cylinder 121 may be decreased to move the pair of pistons 210. In this case, the distance between the pair of pistons 210 may be reduced to release the pair of left and right pistons 210. Through such a process, the main braking may be released.

The elastic member 220 may be installed in the cylinder 121, and disposed between the pair of pistons 210. As the elastic member 220 is disposed between the pair of pistons 210, the elastic member 220 may prevent the pair of pistons 210 from directly colliding with each other while returning to the inside of the cylinder 121, thereby reducing a shock force applied to the pistons 210. Furthermore, the elastic member 220 may interfere with fluid introduced between the pair of pistons 210 through the hydraulic pressure flow path 122, and thus uniformly disperse and spread the hydraulic pressure. An elastic spring or the like may be applied as the elastic member 220.

Referring to FIGS. 1 and 3, the parking braking part 300 in accordance with the embodiment of the present invention may include the actuator 310, the gear part 320 and the rod part 330.

The gear part 320 may serve to receive a rotational driving force from the actuator 310, and transfer the rotational driving force to the rod part 330. The gear part 320 having a worm wheel gear structure may be disposed in the rod housing part 130. The driving gear 321 of the gear part 320 may have a worm gear structure, and may be installed in the driving shaft housing part 132, and coaxially connected to the output shaft of the actuator 310 introduced into the driving shaft housing part 132. The driven gear 322 of the gear part 320 may have a wheel gear structure engaged with the worm gear, and may be disposed in the middle of the rod cylinder 131.

The rod part 330 may serve to convert a rotational displacement of the gear part 320 into a straight displacement, and transfer the straight displacement to the shoes 2. The rod part 330 may include a rotating rod 331 and a push rod 332, and may be installed in the rod cylinder 131. The rotating rod 331 may be formed as one rod member, and coaxially connected to the driven gear 322. The push rod 332 may be connected to an end of the rotating rod 331 through a screw coupling part with the rotating rod 331. While moved to the inside and outside of the rod cylinder 131 in connection with the rotation and movement of the rotating rod 331, the push rod 332 may be pressurize the shoe 2 toward the drum or release the shoe 2 from the drum.

In the present embodiment, the pair of left and right push rods 332 may be arranged at both ends of the rod cylinder 131. An end of the push rod 332, exposed to the outside of the rod cylinder 131, may have the same structure as the end of the piston 210, where the coupling groove 211 and the shoe coupling part 212 are formed. As the inner circumference 118a of the rod sealing part 118 are fitted and fixed to the groove formed on the outer circumference of the push rod 332, the rod cylinder 131 may be sealed by the rod sealing part 118. The end of the push rod 332 may be formed in a slit shape into which the end of the shoe 2 can be inserted, and engaged with the shoe 2.

When the actuator 310 is driven in the forward direction, the rotational force of the actuator 310 may be transferred to the rotating rod 331 through the gear part 320, and the rotating rod 331 may be rotated in the forward direction in connection with the gear part 320. At this time, the pair of push rods 332 may be moved while the distance therebetween is extended along the rotating rod 331, and push the pair of left and right shoes 2. Through such a process, parking braking may be performed. When the actuator 310 is driven in the backward direction, the pair of push rods 332 may be moved while the distance therebetween is shortened, and release the pair of left and right shoes 2. Through such a process, parking braking may be released.

The drum brake apparatus 1 in accordance with the embodiment of the present invention may have an integrated structure in which the main braking part 200 and the parking braking part 300 are coupled to the one housing 100. Thus, the main braking apparatus and the parking braking apparatus can be installed at the same time through a simple process of installing the housing 100 on the back plate 5.

Thus, the manufacturing process can be further simplified in the related art in which the main braking apparatus and the parking braking apparatus are separately manufactured and managed, assembly positions need to be set and adjusted in order to secure a distance between the main braking apparatus and the parking braking apparatus in consideration of interference therebetween according to the specification, and the main braking apparatus and the parking braking apparatus are designed and assembled. Furthermore, the distance between the main braking part 200 and the parking braking part 300 can be further reduced, which makes it possible to reduce the size and weight and to improve the space utilization.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A drum brake apparatus comprising:
   a back plate;
   brake shoes placed over the back plate;
   a housing coupled to the back plate, and comprising a first side facing a first one of the brake shoes, a second side facing a second one of the brake shoes, a main brake piston hole extending between the first side and the second side, and a parking brake rod hole extending between the first side and the second side;
   a main brake comprising a pair of pistons installed in the main brake piston hole, the main brake being configured to pressurize the brake shoes using hydraulic pressure during main braking; and
   a parking brake comprising at least one rod installed in the parking brake rod hole, the parking brake being configured to pressurize the brake shoes using electromotive force during parking braking.

2. The drum brake apparatus of claim 1, wherein the main brake comprises:
   the pair of pistons configured to move outside of the housing by hydraulic pressure to pressurize the brake shoes; and
   an elastic member disposed in the main brake piston hole for reducing a shock force applied to the pistons when the pistons returns.

3. The drum brake apparatus of claim 2, wherein the elastic member is disposed between the pair of pistons.

4. The drum brake apparatus of claim 1, wherein the parking brake comprises:
   a gear disposed in the housing, and configured to rotate; and
   the at least one rod connected to the gear and configured to move outside the housing by the rotation of the gear.

5. The drum brake apparatus of claim 1, wherein the main brake piston hole and the parking brake rod hole are arranged side by side.

6. The drum brake apparatus of claim 1, wherein the housing comprises:
   a main body comprising the main brake piston hole and the parking brake rod hole that are arranged side by side; and
   a first side cover coupled to the first side to block foreign matters from introducing into the main brake piston hole and the parking brake rod hole; and
   a second side cover coupled to the second side to block foreign matters from introducing into the main brake piston hole and the parking brake rod hole.

7. The drum brake apparatus of claim 1, wherein the housing comprises a driving shaft recess connected to the parking brake rod hole and configured to receive a driving shaft of an actuator.

8. The drum brake apparatus of claim 1, wherein the parking brake rod hole is disposed at a preset distance from the main brake piston hole.

9. A drum brake apparatus comprising:
   a housing;
   a main braking part installed at one side of the housing, and driven by hydraulic pressure to pressurize shoes during main braking; and
   a parking braking part installed at the other side of the housing, and driven by an electromotive force to pressurize the shoes during parking braking, wherein the housing comprises:
a housing part;
a hollow piston housing part formed at one side of the housing part, and having the main braking part installed therein; and
a hollow rod housing part formed at the other side of the housing part, and having the parking braking part installed therein,
wherein the housing part comprises:
a main body part in which the piston housing part and the rod housing part are formed;
a fixing part formed on the main body part, and fixed to a back plate; and
a foreign matter prevention part coupled to one side of the main body part, where openings of the piston housing part and the rod housing part are positioned, and covering the edge of the piston housing part and the edge of the rod housing part.

10. The drum brake apparatus of claim 9, wherein the fixing part comprises:
a fixed fastening part formed at both sides of the main body part, and fixed to the back plate with an actuator by a fastening member; and
a movement prevention part protruded from a position of the main body part, corresponding to the main braking part, and fitted into a through-hole formed in the back plate.

11. The drum brake apparatus of claim 9, wherein the foreign matter prevention part comprises:
a connection part disposed between the opening of the piston housing part and the opening of the rod housing part;
a piston sealing part having a ring shape corresponding to the edge of the piston housing part, formed continuously with one side of the connection part, and having an inner end connected to the main braking part;
a rod sealing part having a ring shape corresponding to the edge of the rod housing part, formed continuously with the other side of the connection part, and having an inner end connected to the parking braking part; and
a main body fixing part formed on the connection part, and fixed to the main body part.

12. The drum brake apparatus of claim 9, wherein the foreign matter prevention part is formed of a ductile or flexible material.

13. The drum brake apparatus of claim 9, wherein the piston housing part comprises:
a hollow cylinder formed in a circumferential shape on the housing part, and having the main braking part housed therein; and
a hydraulic pressure flow path extended from an outer surface of the housing part to the cylinder, and forming a flow path to supply fluid into the cylinder.

14. The drum brake apparatus of claim 13, wherein the hydraulic pressure flow path has an open outer end formed at the movement prevention part installed on the rear surface of the main body part, and an inner end facing an elastic member of the main braking part installed in the cylinder.

15. The drum brake apparatus of claim 9, wherein the rod housing part comprises:
a hollow rod cylinder formed in a circumferential shape on the housing part, and having the parking braking part housed therein; and
a driving shaft housing part disposed at a preset distance from the piston housing part and communicating with the rod cylinder, wherein an output shaft of the actuator is introduced into the driving shaft housing part and connected to the parking braking part.

16. The drum brake apparatus of claim 15, wherein a fastening member for fastening the housing part to the back plate is disposed at a position spaced apart by a preset distance from the central axis of the driving shaft housing part toward the piston housing part.

* * * * *